(12) United States Patent
Kito et al.

(10) Patent No.: US 12,286,025 B2
(45) Date of Patent: Apr. 29, 2025

(54) CHARGING SYSTEM AND CHARGING CONTROL METHOD

(71) Applicant: FUJI CORPORATION, Chiryu (JP)

(72) Inventors: Shuichiro Kito, Toyota (JP); Koji Kawaguchi, Kasugai (JP); Hisato Sawanami, Kariya (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 18/260,667

(22) PCT Filed: Feb. 24, 2021

(86) PCT No.: PCT/JP2021/006908
§ 371 (c)(1),
(2) Date: Jul. 7, 2023

(87) PCT Pub. No.: WO2022/180699
PCT Pub. Date: Sep. 1, 2022

(65) Prior Publication Data
US 2024/0051418 A1 Feb. 15, 2024

(51) Int. Cl.
*B60L 53/62* (2019.01)
*H02J 7/00* (2006.01)
(52) U.S. Cl.
CPC ........ *B60L 53/62* (2019.02); *H02J 7/007192* (2020.01)
(58) Field of Classification Search
CPC .......................... B60L 53/62; H02J 7/007192

USPC .......................................................... 307/9.1
See application file for complete search history.

(56) References Cited

U.S. PATENT DOCUMENTS

2010/0283431 A1* 11/2010 Kano ...................... G06F 1/203
361/679.48
2016/0149418 A1* 5/2016 Jung ................. H02J 7/007194
320/152
2019/0363563 A1* 11/2019 Zhang ..................... B60L 58/27

FOREIGN PATENT DOCUMENTS

CN       111731150 A      10/2020
JP       2005-6461 A       1/2005
JP       2014-184749 A    10/2014

OTHER PUBLICATIONS

International Search Report Issued May 18, 2021, in PCT/JP2021/006908, filed on Feb. 24, 2021, therein, 2 pages.

* cited by examiner

*Primary Examiner* — Michael R. Fin
(74) *Attorney, Agent, or Firm* — Oblon, McClelland, Maier & Neustadt, L.L.P.

(57) ABSTRACT

A charging system for charging a battery of an automatic conveyance vehicle configured to automatically convey an article includes a temperature acquisition section configured to acquire a temperature when charging the battery, and a control section configured to control power supply of the automatic conveyance vehicle when charging the battery based on the temperature acquired by the temperature acquisition section.

3 Claims, 7 Drawing Sheets

CHARGING SYSTEM AND CHARGING CONTROL METHOD

TECHNICAL FIELD

The present description discloses a charging system and a charging control method.

BACKGROUND ART

In the conventional art, a system having a charging station (standby station) that charges a battery of an automatic conveyance vehicle including a motor for driving wheels and the battery for supplying electric power to the motor and automatically conveying articles has been proposed. For example, Patent Literature 1 exemplifies a system for traveling an automatic conveyance vehicle in a low-temperature environment, such as a refrigeration facility, and a charging electrode and a heating electrode are provided in a charging station. Then, in a case where the automatic conveyance vehicle stops at the charging station, the charging electrode and the heating electrode come into contact with the electrodes of the automatic conveyance vehicle, respectively, so that the charging of the battery and the warming of the automatic conveyance vehicle are simultaneously performed. This prevents the automatic conveyance vehicle from becoming low in temperature and causing the electronic device including the battery to malfunction.

PATENT LITERATURE

Patent Literature 1: JP-A-2014-184749

BRIEF SUMMARY

Technical Problem

In the above-described system, in order to keep the automatic conveyance vehicle warm during charging, it is necessary to provide the heating electrode in the charging station and to provide the electrode corresponding to the heating electrode in each automatic conveyance vehicle, respectively. That is, since it is necessary to provide a dedicated configuration for heat retention, not only the configuration becomes complicated but also the cost increases.

A main object of the present disclosure is to appropriately keep an automatic conveyance vehicle warm according to a temperature environment during charging with a simple configuration.

Solution to Problem

The present disclosure employs the following means for achieving the above-described main object.

A charging system, of the present disclosure, for charging a battery of an automatic conveyance vehicle configured to automatically convey an article, the system includes:
- a temperature acquisition section configured to acquire a temperature when charging the battery; and
- a control section configured to control power supply of the automatic conveyance vehicle when charging the battery based on the temperature acquired by the temperature acquisition section.

In the charging system of the present disclosure, it is possible to control the power supply of the automatic conveyance vehicle when charging the battery based on the temperature when charging of the battery.

DESCRIPTION OF EMBODIMENTS

First Embodiment

Figure 1:
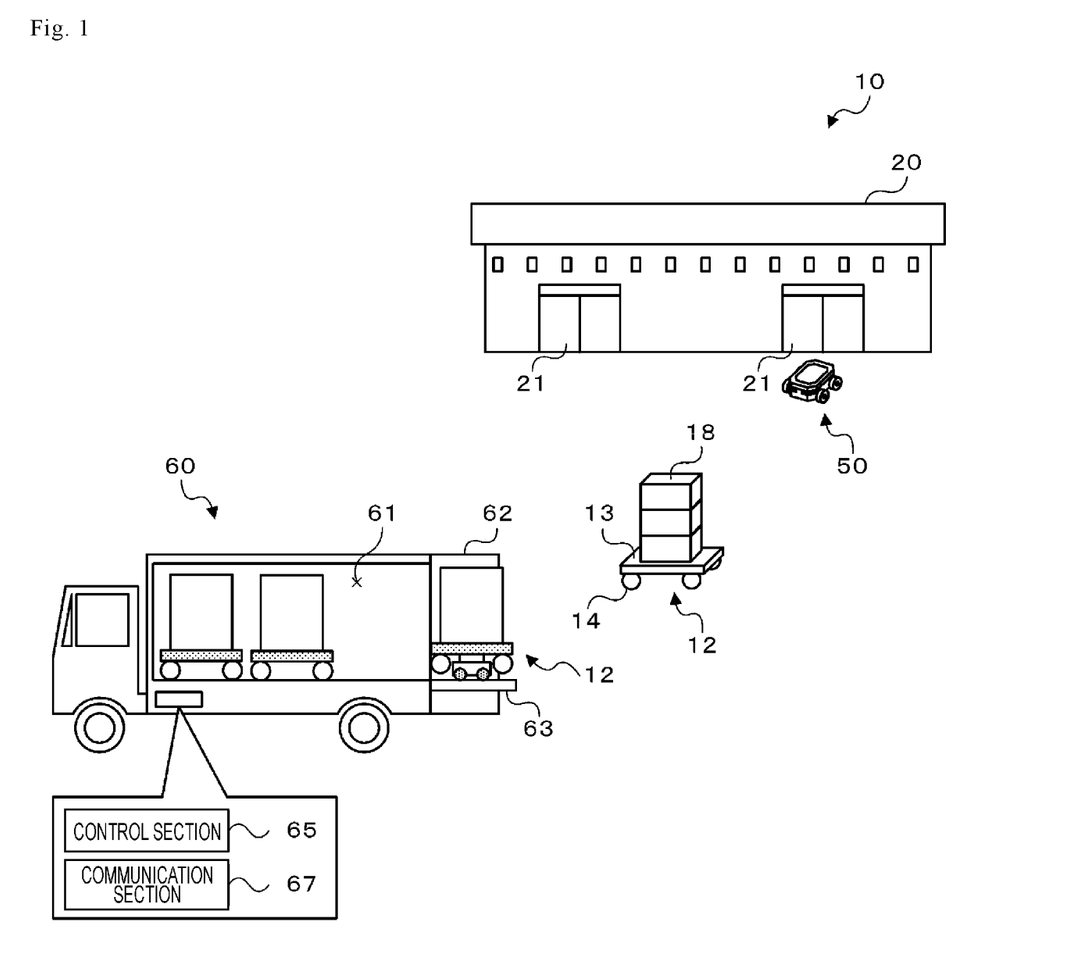
FIG. 1 is an explanatory diagram illustrating an example of article management system 10.
Figure 2:
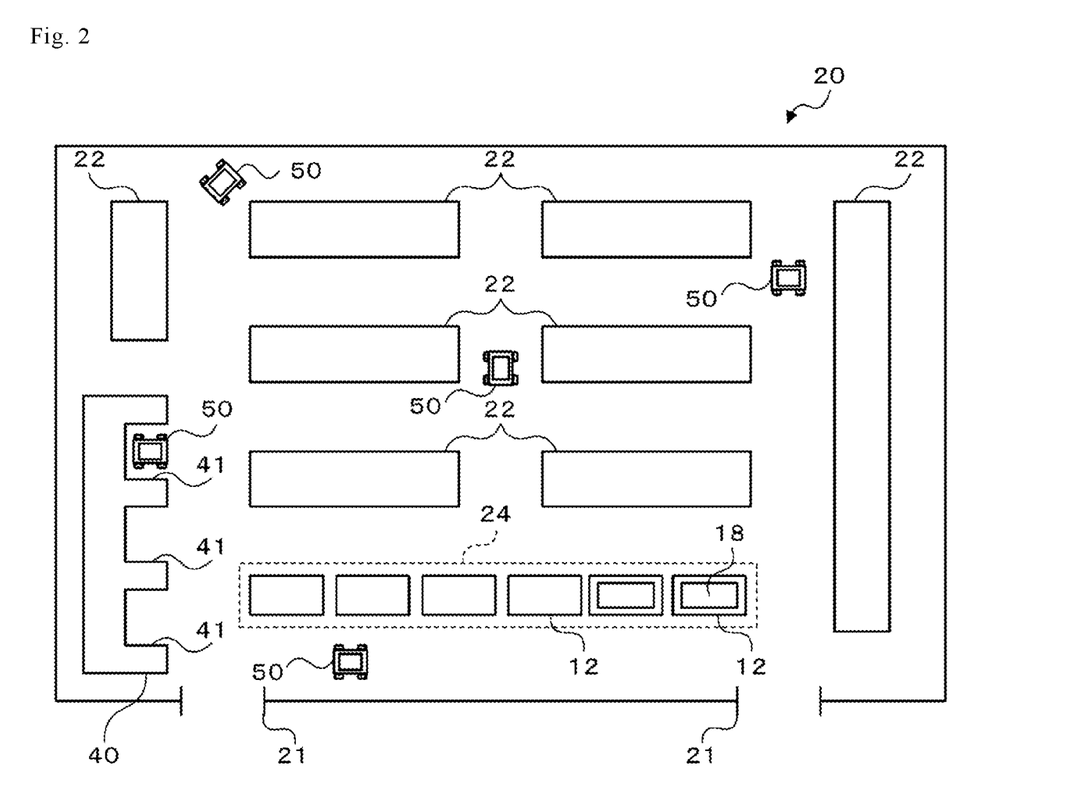
FIG. 2 is an explanatory diagram illustrating an example of warehouse 20.
Figure 3:
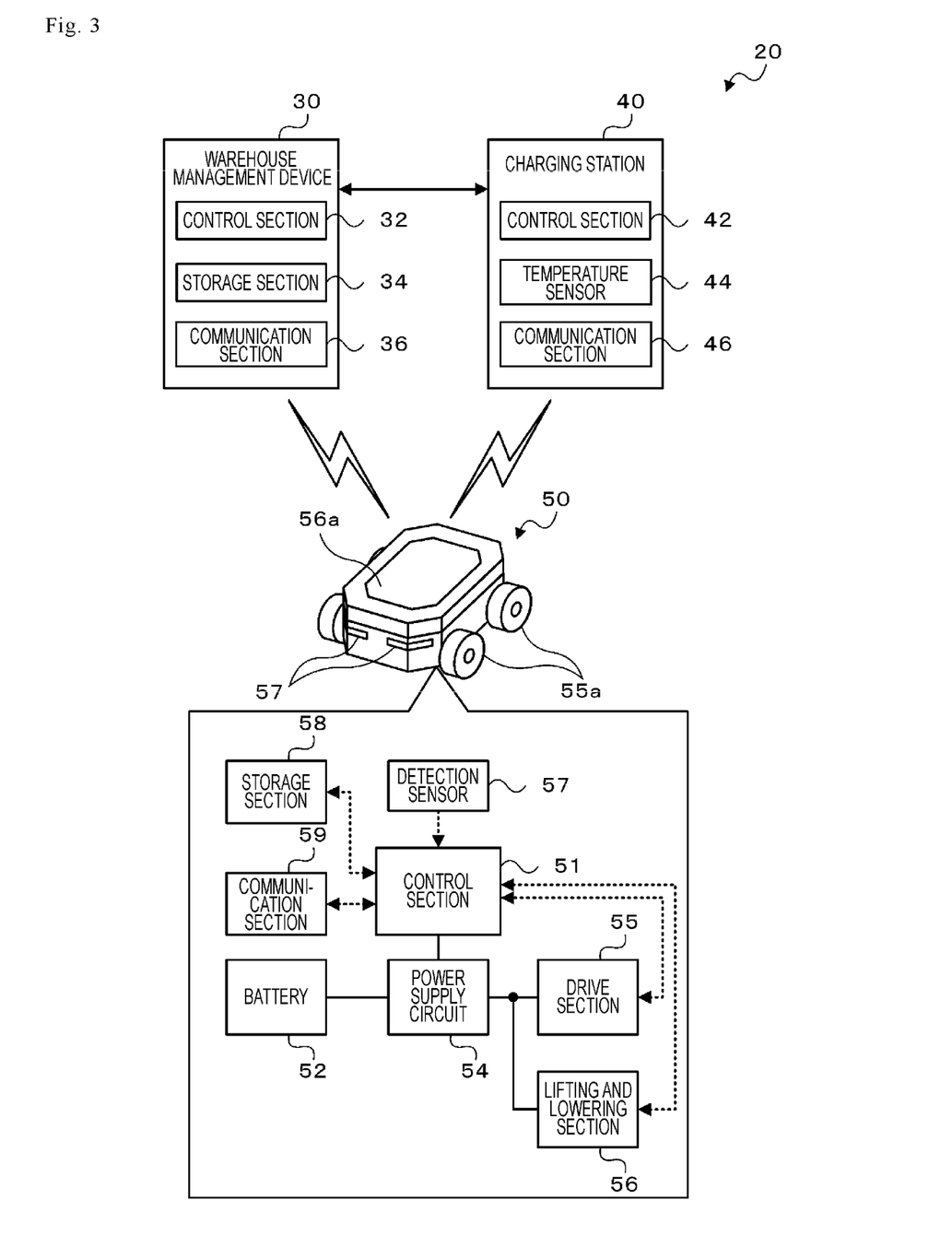
FIG. 3 is a block diagram illustrating a configuration related to control of warehouse 20 and AMR 50.

Next, the first embodiment of the present disclosure will be described with reference to the drawings. FIG. 1 is an explanatory diagram illustrating an example of article management system 10. FIG. 2 is an explanatory diagram illustrating an example of warehouse 20. FIG. 3 is a block diagram illustrating a configuration related to control of warehouse 20 and AMR 50. Article management system 10 manages articles delivered by delivery vehicle 60 and accommodated in warehouse 20, articles delivered from warehouse 20 to a desired destination by delivery vehicle 60, and the like. Wheeled platform 12, autonomous mobile robot (AMR) 50, or the like is used to convey the article in warehouse 20 or between warehouse 20 and delivery vehicle 60. Here, examples of the article include foods such as frozen foods, daily necessities, and various industrial products. In FIG. 1, the article is accommodated in accommodation box 18, but in the following, it is simply referred to as an article without particularly distinguishing whether the article is accommodated in accommodation box 18. In addition, the delivery of the article is not limited to delivery vehicle 60, and may also include trains, ships, aircraft, and the like.

Wheeled platform 12 includes plate-shaped loading section 13 for loading the articles, and caster 14 disposed on a lower surface side of loading section 13 as traveling wheels. The article is transferred to the loading section of wheeled platform 12 by an operator, an arm robot, or the like (not illustrated). Wheeled platform 12 is moved by the operator and is also automatically moved by AMR 50. Wheeled platform 12 may be a wheeled basket.

Warehouse 20 includes multiple storage shelves (storages) 22, warehouse management device 30, and charging station 40, and is provided with doorway 21 and standby area 24 of wheeled platform 12. The article conveyed into warehouse 20 by wheeled platform 12 or AMR 50 is accommodated in each of storage shelves 22 by an operator, an arm robot, or the like (not illustrated). In addition, the article accommodated in storage shelf 22 is transferred to wheeled platform 12 and accommodated in delivery vehicle 60, or is transferred to AMR 50 and conveyed to other storage shelves 22 or standby area 24 by an operator, an arm robot, or the like. Wheeled platform 12 on which an article waiting to be accommodated in storage shelf 22 is loaded, wheeled platform 12 on which an article waiting to be accommodated in delivery vehicle 60 is loaded, and the like wait in standby area 24. Warehouse 20 may be an automatic warehouse capable of automatically taking in and out articles on storage shelf 22, or may be a frozen warehouse for storing frozen food and the like, for example.

Warehouse management device 30 includes control section 32, storage section 34, and communication section 36. Control section 32 manages accommodation of articles in storage shelf 22, dispensing of articles, conveyance of articles by AMR 50 and wheeled platform 12, and the like. Storage section 34 stores various application programs, various data files, and the like. In addition, storage section 34 stores information of an article accommodated in each storage shelf 22, information of a traveling schedule of each AMR 50, and the like. Communication section 36 can communicate with an external device such as charging station 40 and AMR 50 by wire or wirelessly.

In charging station 40, one or more (for example, three in FIG. 2) charging areas 41 are provided, so that in a case where AMR 50 stops at a predetermined position in charging area 41, a connector is connected to enable charging of AMR 50. Charging station 40 may be able to charge AMR 50 in a non-contact manner. Charging station 40 includes control section 42, temperature sensor 44, and communication section 46. Control section 42 performs charging control of AMR 50 in each charging area 41, instructs AMR 50 during charging, and the like. Temperature sensor 44 measures ambient temperature Ta of each charging area 41 and outputs it to control section 42. Communication section 46 can communicate with an external device such as warehouse management device 30 and AMR 50 by wire or wirelessly.

AMR 50 includes control section 51, battery 52, power supply circuit 54, drive section 55, lifting and lowering section 56, detection sensor 57, storage section 58, and communication section 59, and autonomously travels in any direction to automatically convey the articles while avoiding surrounding obstacles or the like.

Battery 52 is configured as, for example, a lithium ion secondary battery or a nickel hydrogen secondary battery, and outputs electric power of a predetermined voltage to power supply circuit 54. Power supply circuit 54 supplies electric power from battery 52 as high voltage electric power necessary for a drive system such as drive section 55 and lifting and lowering section 56, or as low voltage electric power necessary for a control system such as control section 51 and communication section 59 other than the drive system. Drive section 55 includes a motor, a steering mechanism, and the like for rotationally driving wheels 55a, and moves AMR 50. Wheel 55a may be configured as a mecanum wheel. Lifting and lowering section 56 is configured as a lifting and lowering device that lifts and lowers lifting and lowering plate 56a constituting an upper surface of AMR 50 up and down by a cylinder or the like. AMR 50 is connected to wheeled platform 12 by raising lifting and lowering plate 56a by the drive of lifting and lowering section 56 and lifting loading section 13 in a state of being located below wheeled platform 12, so that wheeled platform 12 can be moved.

Detection sensor 57 detects the presence or absence of an object around AMR 50 and a distance to the object by irradiating the periphery with, for example, laser light or sound waves and detecting reflected waves. Control section 51 controls entire AMR 50, and outputs control signals to power supply circuit 54, drive section 55, and lifting and lowering section 56, or inputs detection information from detection sensor 57, the driving state of drive section 55, lifting and lowering section 56, and the like. In addition, control section 51 grasps a moving direction, a moving speed, a moving distance, a current position, and of AMR 50 based on the driving state of drive section 55 and the like. Control section 51 causes drive section 55 so as to travel while avoiding surrounding objects, creates a map in warehouse 20 while traveling, or updates the map, based on the detection information from detection sensor 57. Storage section 58 stores various application programs and various data files. In addition, storage section 58 also stores a map created by control section 51. Communication section 59 wirelessly exchanges information with an external device such as warehouse management device 30 and charging station 40. In the present embodiment, AMR 50 is exemplified, but it may only be an automatic conveyance vehicle configured to automatically convey the article, and may be an automatic guided vehicle (AGV) for moving on a traveling path determined in advance.

Delivery vehicle 60 is a vehicle that loads and delivers one or more wheeled platforms 12. Delivery vehicle 60 loads wheeled platform 12 on which an article is loaded at a production site or the like (not illustrated) and delivers it to warehouse 20, or loads wheeled platform 12 on which an article is loaded at warehouse 20 and delivers it to a predetermined destination. As illustrated in FIG. 1, delivery vehicle 60 includes cargo chamber 61, tail gate 62, tail lift 63, control section 65, and communication section 67. Cargo chamber 61 is a space for loading wheeled platform 12. Tail gate 62 is provided in a rear portion of the vehicle to open and close cargo chamber 61 by driving an electric actuator, a hydraulic actuator, or the like. When tail gate 62 is opened, tail lift 63 enables wheeled platform 12, AMR 50, and the like to board by making the boarding surface horizontal, and is lifted and lowered between the floor surface of cargo chamber 61 and the road surface up and down by driving of an electric actuator, a hydraulic actuator, or the like. Control section 65 controls the operation of tail gate 62 and tail lift 63 by communication with an external device via communication section 67. In addition, control section 65 may control the operation of tail lift 63 or the like based on an operation instruction received from an operator (driver) via an operation panel (not illustrated). Communication section 67 wirelessly exchanges information with an external device such as warehouse management device 30 and AMR 50. In a case where control section 65 is configured to control the operation of tail lift 63 or the like exclusively based on the operation instruction of the operator, communication section 67 need not be provided. In addition, delivery vehicle 60 may be configured as a freezing vehicle for delivering frozen food and the like.

Figure 4:
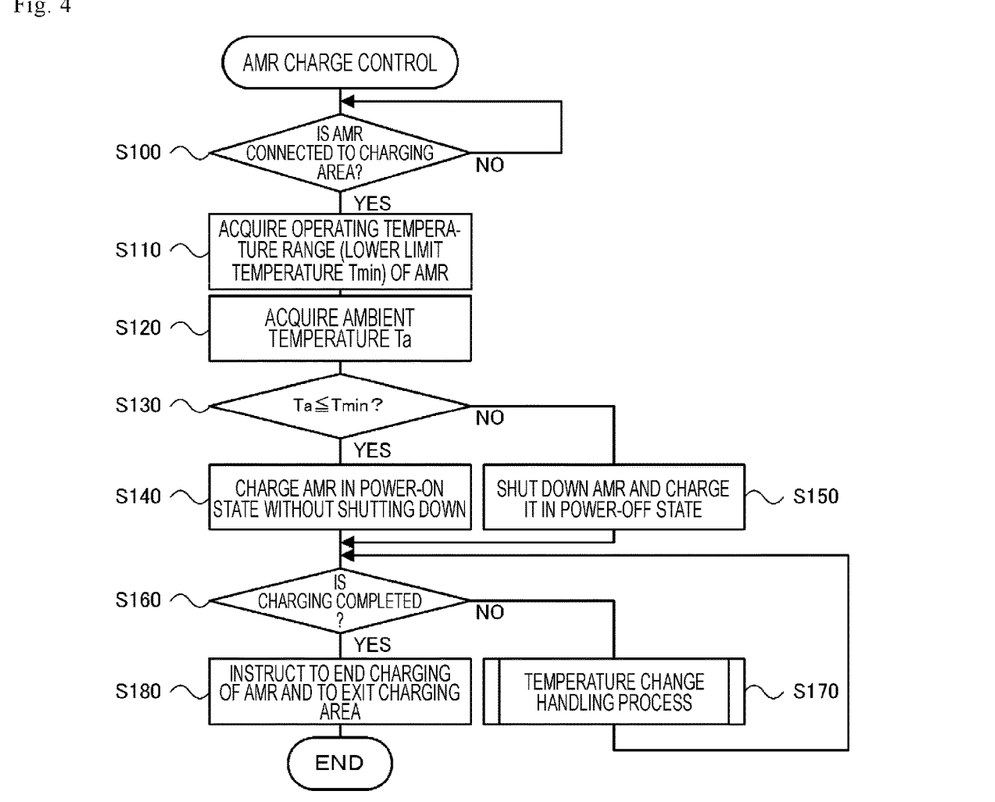
FIG. 4 is a flowchart illustrating an example of AMR charging control.

The following is a description of the operation of article management system 10 configured in this manner, particularly the charging control of AMR 50 in charging station 40. FIG. 4 is a flowchart illustrating an example of AMR charging control, and is performed by control section 42 of charging station 40. In the AMR charging control, control section 42 waits for AMR 50 to be connected in a chargeable manner to any charging area 41 of charging station 40 (S100).

In a case where it is determined that AMR 50 is connected to charging area 41 so as to be chargeable, control section 42 acquires lower limit temperature Tmin of an operating temperature range of AMR 50 (S110), and also acquires ambient temperature Ta of charging area 41 from temperature sensor 44 (S120). The operating temperature range is determined based on specifications of each section of AMR 50, and for example, lower limit temperature Tmin is determined to be 0° C. or the like. Control section 42 may acquire the operating temperature range by communication with AMR 50 every time AMR 50 is connected to charging area 41, and may acquire the operating temperature range by communication with warehouse management device 30. Alternatively, control section 42 may store the operating temperature range of AMR 50 used in warehouse 20 in advance in a storage section (not illustrated), and may read and acquire the operating temperature range when AMR 50 is connected.

Next, control section 42 determines whether ambient temperature Ta is equal to or lower than lower limit temperature Tmin (S130), and in a case where it is determined that ambient temperature Ta is equal to or lower than lower limit temperature Tmin, control section 42 charges AMR 50 in a power-on state without shutting down (S140). On the other hand, in a case where it is determined that ambient temperature Ta is higher than lower limit temperature Tmin, control section 42 shuts down AMR 50 and charges it in the power-off state (S150).

Subsequently, control section 42 determines whether the charging of AMR 50 has been completed (S160). In S160, control section 42 determines that the charging has been completed, for example, in a case where the voltage or the power storage ratio of battery 52 reaches a predetermined full charge voltage or full charge ratio. In a case where it is determined that the charging has not been completed in S160, control section 42 performs a temperature change handling process illustrated in FIG. 5 (S170), and returns to S160 again. In a case where it is determined that the charging has been completed in S160, control section 42 instructs AMR 50 to end the charging of AMR 50 and to exit charging area 41 (S180), and ends the AMR charging control.

Figure 5:
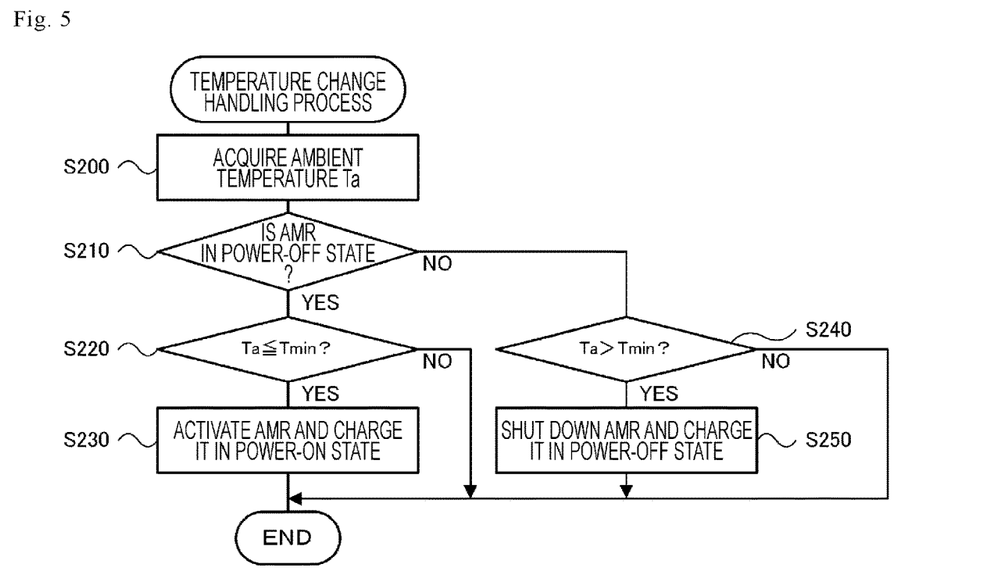
FIG. 5 is a flowchart illustrating an example of a temperature change handling process.
Figure 6:
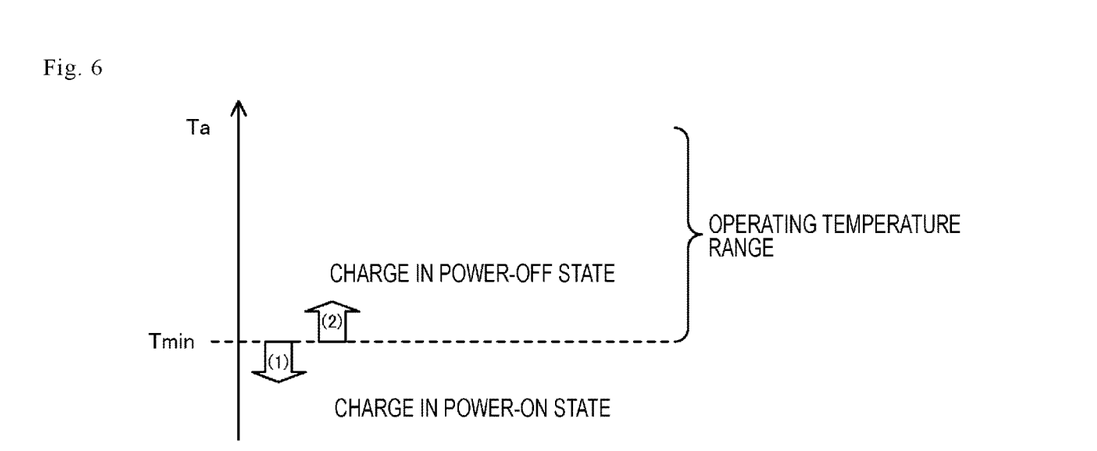
FIG. 6 is an explanatory diagram illustrating an example of ambient temperature Ta and a power supply state of AMR 50.

FIG. 5 is a flowchart illustrating an example of the temperature change handling process, and FIG. 6 is an explanatory diagram illustrating an example of ambient temperature Ta and the power supply state of AMR 50. In this process, control section 42 acquires ambient temperature Ta of charging area 41 from temperature sensor 44 (S200), and determines whether AMR 50 is in the power-off state (S210). In a case where it is determined that AMR 50 is in the power-off state, control section 42 determines whether ambient temperature Ta is equal to or lower than lower limit temperature Tmin (S220), and in a case where it is determined that ambient temperature Ta is higher than lower limit temperature Tmin, the temperature change handling process is ended. On the other hand, in a case where it is determined that ambient temperature Ta is equal to or lower than lower limit temperature Tmin, control section 42 activates AMR 50 and charges it in the power-on state (S230, (1) of FIG. 6), and ends the temperature change handling process.

In addition, in a case where it is determined that AMR 50 is in the power-on state in S210, control section 42 determines whether ambient temperature Ta is higher than lower limit temperature Tmin (S240), and in a case where it is determined that ambient temperature Ta is equal to or lower than lower limit temperature Tmin, the temperature change handling process is ended. On the other hand, in a case where it is determined that ambient temperature Ta is higher than lower limit temperature Tmin, control section 42 shuts down AMR 50 in the power-on state and charges it in the power-off state (S250, (2) of FIG. 6), and ends the temperature change handling process. In order to prevent the power supply states of AMR 50 from being switched frequently, the temperatures for the determination of S220 and S240 may be different. For example, in S240, a determination temperature slightly higher than lower limit temperature Tmin may be used.

Here, a correspondence between elements of the present embodiment and elements of the present disclosure will be clarified. Temperature sensor 44 and control section 42 for performing the process of S120 of the AMR charging control in the present embodiment correspond to a temperature acquisition section, and control section 42 for performing the AMR charging control (excluding the process of S120) corresponds to the control section.

In above-described charging station 40, in a case where ambient temperature Ta is equal to or lower than lower limit temperature Tmin at the time of starting of the charging, AMR 50 is charged without being shut down. In a case where AMR 50 is shut down, AMR 50 may not be activated normally depending on ambient temperature Ta at the time of end of the charging. In particular, in a case where warehouse 20 is a frozen warehouse, ambient temperature Ta may be significantly lower than lower limit temperature Tmin, so that there is a high possibility that warehouse 20 cannot be activated normally. In the present embodiment, AMR 50 can be kept warm with a simple configuration that does not require a dedicated configuration for heat retention by charging it in the power-on state, so that AMR 50 can be stably operated after the charging is ended. On the other hand, in a case where ambient temperature Ta is higher than lower limit temperature Tmin, AMR 50 is shut down and battery 52 is charged. Therefore, in a case where there is no possibility that AMR 50 cannot be activated normally, it is possible to appropriately suppress the power consumption of AMR 50 during the charging.

In addition, during charging in the power-off state, in a case where ambient temperature Ta becomes equal to or lower than lower limit temperature Tmin, AMR 50 is activated, and during charging in the power-on state, in a case where ambient temperature Ta becomes higher than lower limit temperature Tmin, AMR 50 is shut down. Therefore, it is possible to appropriately handle the change in ambient temperature Ta during charging.

As a matter of course, the present disclosure is not in any way limited to the above-described embodiment, and the present disclosure can be implemented in various aspects as long as the aspects fall within the technical scope of the present disclosure.

In the first embodiment described above, the power supply state of AMR 50 is switched as compared with lower limit temperature Tmin by acquiring ambient temperature Ta of charging area 41; however, the configuration is not limited to this, and the power supply control of AMR 50 may only be performed based on the temperature acquired when charging. For example, the temperature detected by the temperature sensor provided in AMR 50, the temperature sensor provided in warehouse 20 or the outside of warehouse 20 may be acquired, or the expected air temperature of the weather forecast may be acquired by communication via a network or the like, without being limited to ambient temperature Ta. In addition, it is not limited to lower limit temperature Tmin, but may be compared with a predetermined temperature corresponding to lower limit temperature Tmin of the operating temperature range. For example, heat retention of AMR 50 may be prioritized using a temperature slightly higher than lower limit temperature Tmnin as a predetermined temperature. In addition, in a case where the power supply is turned on at a temperature equal to or lower than a predetermined temperature higher than lower limit temperature Tmin, the power supply of AMR 50 is controlled so that the temperature does not become equal to or lower than lower limit temperature Tmin during the charging.

In the first embodiment, the power supply of AMR 50 is turned on in a case where the temperature is equal to or lower than lower limit temperature Tmin during the charging in the power-off state; however, the configuration is not limited to this. For example, during charging in the power-off state, AMR 50 may be activated at every predetermined time interval, that is, periodically, to bring AMR 50 to the power-on state, and then to the power-off state again after a certain period has elapsed. In this case, AMR 50 may be periodically activated to confirm that ambient temperature Ta or the temperature of the temperature sensor provided in AMR 50 is higher than lower limit temperature Tmin, and then AMR 50 may be in the power-off state. In this way, it is possible to control the power supply of AMR 50 so as not to become equal to or lower than lower limit temperature Tmin.

Figure 7:
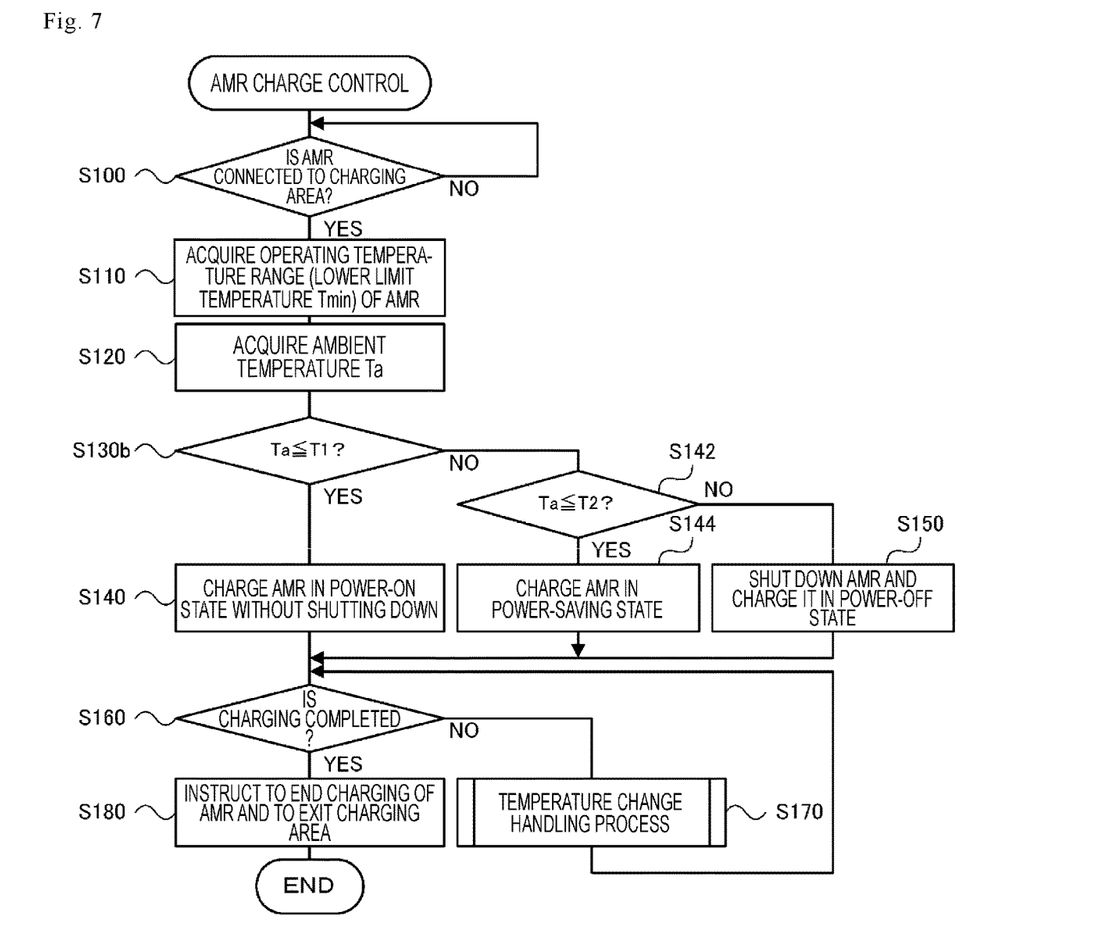
FIG. 7 is a flowchart illustrating AMR charging control according to a modification example.

In the first embodiment, battery 50 is charged with AMR 50 in the power-on state or the power-off state; however, the configuration is not limited to this, and battery 50 may be charged in other states. For example, power supply circuit 54 of AMR 50 can be transitioned to a power-saving state such as a so-called sleep state in which the electric power supply of a high voltage to the drive system is interrupted while maintaining the electric power supply of a low voltage to the control system, and the charging control of AMR 50 is performed as follows. FIG. 7 is a flowchart illustrating AMR charging control according to a modification example. In the modification example, the same process as in FIG. 4 is given the same step number, and description thereof will be omitted.

In the AMR charging control, control section 42 determines whether ambient temperature Ta is equal to or lower than first temperature T1 (S130b), and whether ambient temperature Ta is equal to or lower than second temperature T2 higher than first temperature T1 (S142), respectively. For example, first temperature T1 can be set to lower limit temperature Tmin. In a case where it is determined that the temperature is equal to or lower than first temperature T1 in S130b, control section 42 charges AMR 50 in the power-on state in S140. In addition, in a case where it is determined that the temperature is higher than first temperature T1 and is equal to or lower than second temperature T2 in S130b and S142, control section 42 charges AMR 50 in a power-saving state without shutting down (S144). In addition, in a case where it is determined that the temperature is higher than second temperature T2 in S142, control section 42 charges AMR 50 in the power-off state in S150. Although the details of the temperature change handling process in S170 are omitted, the power supply state of AMR 50 is switched as follows.

Figure 8:
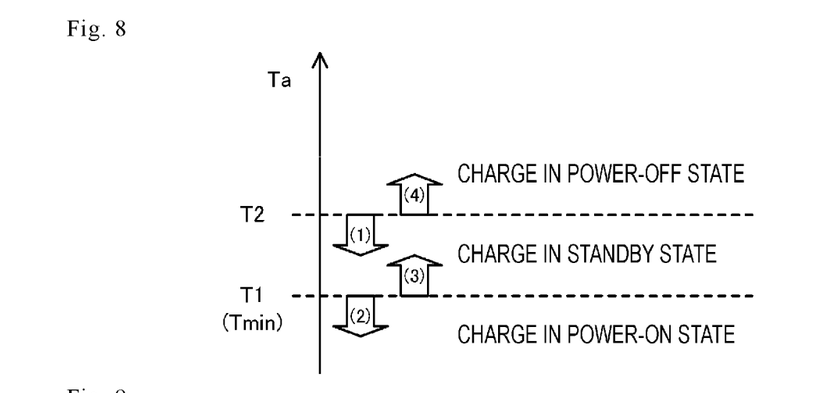
FIG. 8 is an explanatory diagram illustrating ambient temperature Ta and a power supply state of AMR 50 in the modification example.

FIG. 8 is an explanatory diagram illustrating ambient temperature Ta and a power supply state of AMR 50 in the modification example. In a case where ambient temperature Ta becomes equal to or lower than second temperature T2 during charging in the power-off state, control section 42 activates AMR 50 and charges it in a standby state ((1) of FIG. 8). In a case where ambient temperature Ta becomes equal to or lower than first temperature T1 during charging in the standby state, control section 42 charges AMR 50 in the power-on state ((2) of FIG. 8). On the other hand, in a case where ambient temperature Ta becomes higher than first temperature T1 during charging in the power-on state, control section 42 charges AMR 50 in the standby state ((3) of FIG. 8). In a case where ambient temperature Ta becomes higher than first temperature T1 during charging in the standby state, control section 42 charges AMR 50 in the power-off state ((4) of FIG. 8). In order to prevent frequent switching of the power supply state, the power supply state may be switched to first temperature T1 or second temperature T2 with hysteresis.

In this modification example, AMR 50 is configured to be switchable between a power-off state in which the electric power supply is interrupted, a power-saving state in which the electric power supply of the high voltage is interrupted while maintaining the electric power supply of the low voltage, and a power-on state in which both the low voltage and the high voltage electric power supplies are possible, and the power supply state is switched according to ambient temperature Ta. Therefore, since the power supply state is switched more finely according to the temperature when charging battery 52, it is possible to achieve both the suppression of the power consumption and the heat retention, instead of simply turning the power supply state on and off.

In the modification example, first temperature T1 is set to lower limit temperature Tmin of the operating range; however, the configuration is not limited to this, and second temperature T2 may be set to lower limit temperature Tmin. Alternatively, first temperature T1 and second temperature T2 may be determined so that an intermediate (average) temperature between first temperature T1 and second temperature T2 is lower limit temperature Tmin, for example, so as to sandwich lower limit temperature Tmin therebetween. Alternatively, by determining both first temperature T1 and second temperature T2 to be higher than lower limit temperature Tmin, it is possible to control the power supply of AMR 50 such that the temperature does not become equal to or lower than lower limit temperature Tmin during the charging.

In the first embodiment, the power supply state of AMR 50 is switched during the charging; however, the configuration is not limited to this. For example, in a case where AMR 50 is charged in the power-on state at the time of starting of the charging, the power supply may not be turned off during the charging. On the other hand, even if AMR 50 is charged in the power-off state at the time of starting of the charging, the power supply may be turned on during the charging. In this way, it is possible to appropriately keep AMR 50 warm and stably operate it after the charging is ended.

In the first embodiment, a frozen warehouse is exemplified as an example of warehouse 20, but it may be a warehouse handling an article having a normal temperature. Even in such a warehouse, it is meaningful to apply the present embodiment because the environment is low temperature depending on a season such as a winter season and a place such as a cold district such as a winter season. In addition, AMR 50 is not limited to warehouse 20, and may be used in a factory, a shop, or the like, or may be used outdoors without being limited to indoors.

Second Embodiment

Figure 9:
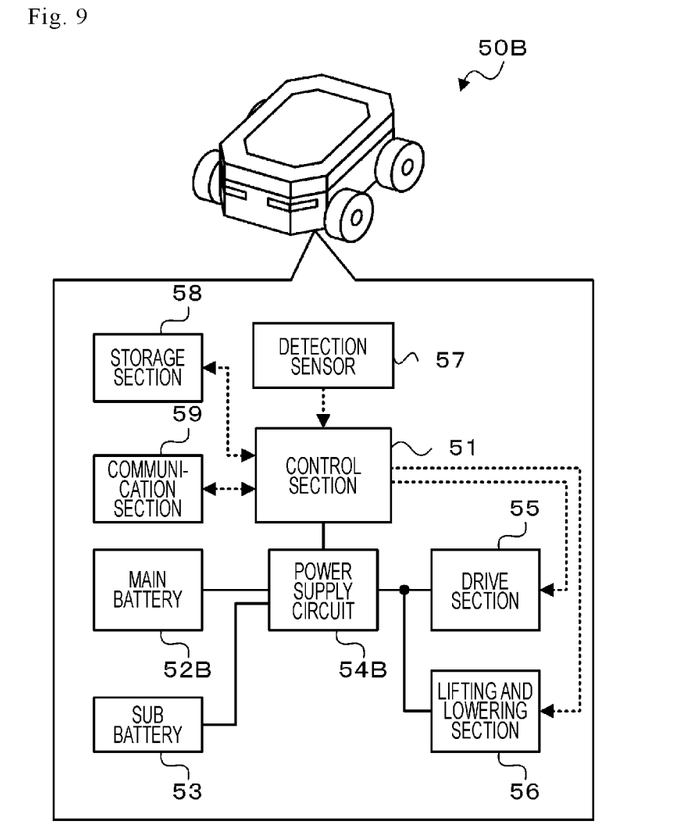
FIG. 9 is a block diagram illustrating a configuration related to control of AMR 50B according to a second embodiment.

Next, the second embodiment will be described. FIG. 9 is a block diagram illustrating a configuration related to control of AMR 50B according to the second embodiment. AMR 50B includes main battery 52B corresponding to battery 52 of the first embodiment, sub battery 53 having a smaller capacity than main battery 52B, and power supply circuit 54B that supplies electric power from each of batteries 52B and 53 to a load such as drive section 55 and lifting and lowering section 56. Other than these, AMR 50B is configured in the same manner as AMR 50 of the first embodiment.

Figure 10:
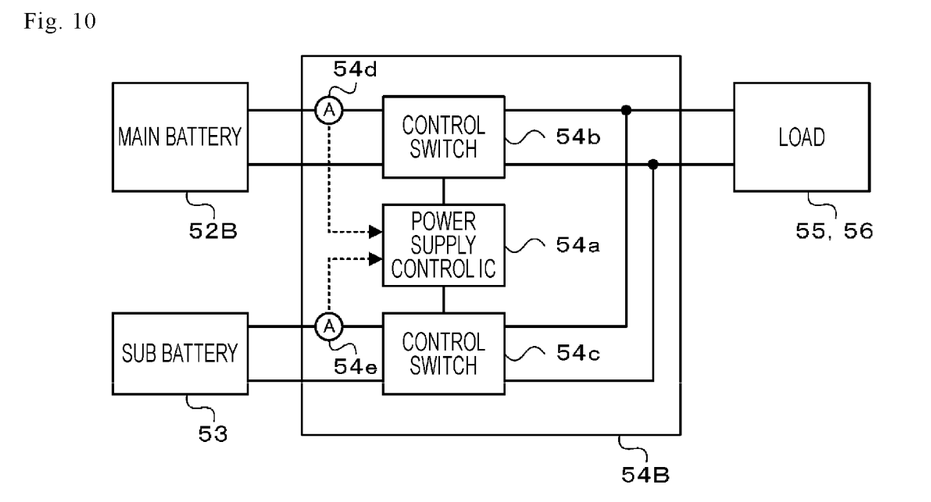
FIG. 10 is a block diagram illustrating a configuration related to electric power supply according to the second embodiment.

FIG. 10 is a block diagram illustrating a configuration related to electric power supply according to the second embodiment. Power supply circuit 54B includes power supply control IC 54a that controls power supply, control switch 54b that controls electric power supply from main battery 52B to the load, and control switch 54c that controls electric power supply from sub battery 53 to the load. In addition, power supply circuit 54B includes current sensor 54d that detects output current I of main battery 52B and current sensor 54e that detects an output current of sub battery 53. The detected values of current sensors 54d and 54e are inputted to power supply control IC 54a.

Figure 11:
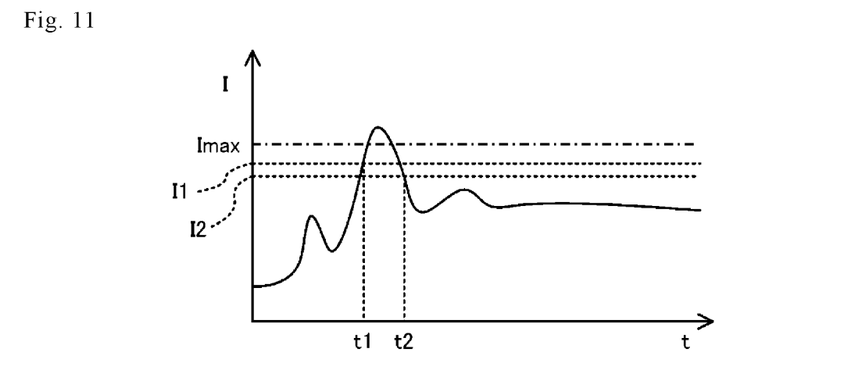
FIG. 11 is an explanatory diagram illustrating an example of a time transition of output current I of main battery 52B.

FIG. 11 is an explanatory diagram illustrating an example of a time transition of output current I of main battery 52B. Power supply control IC 54a monitors output current I from main battery 52B, and in a case where output current I reaches first current I1 (time t1), starts electric power supply from sub battery 53. First current I1 is determined to be a threshold value smaller than rated output current Imax of main battery 52B. As a result, before output current I becomes rated output current Imax, sub battery 53 can be used to supplement the electric power supply to the load. For this reason, main battery 52B can be protected by regarding output current I exceeding rated output current Imax as temporary. In addition, in a case where output current I becomes lower than second current I2 (time t2), power supply control IC 54a ends the electric power supply from sub battery 53 and switches to the electric power supply from main battery 52B only. As described above, in the second embodiment, main battery 52B and sub battery 53 are provided, electric power is normally supplied from main battery 52B, and electric power is supplied from sub battery 53 in a case where power larger than normal is required.

Here, in a case where current request exceeding rated output current Imax is made from the load side and a large current is temporarily required, the overcurrent protection function of main battery 52 may be operated. In the present embodiment, since sub battery 53 is used to supplement the electric power supply, main battery 52B can be prevented from being forcibly stopped by the operation of the overcurrent protection function without recklessly increasing the size of main battery 52B. Therefore, it is possible to prevent the need for the operator to restart AMR 50 and move it again after the forced stop.

In the second embodiment, power supply control IC 54a monitors output current I and switches whether to supply electric power from sub battery 53; however, the configuration is not limited to this. For example, power supply control IC 54a may acquire information such as traveling and operation of AMR 50 from control section 51, calculate a necessary current in advance based on the acquired information, and switch whether to supply electric power from sub battery 53. In the second embodiment, the charge control of AMR 50B can be performed as in FIG. 4 (FIG. 7) of the first embodiment, but the present disclosure is not limited to this, and such a charge control need not be performed.

Here, the charging system of the present disclosure can suppress the power consumption of the automatic conveyance vehicle at the time of charging or can stably operate the automatic conveyance vehicle after the end of the charging according to the temperature when charging the battery. Accordingly, it is possible to appropriately keep the automatic conveyance vehicle warm according to the temperature environment during charging with a simple configuration that does not require a dedicated configuration for keeping the automatic conveyance vehicle warm.

In addition, the charging system of the present disclosure may be configured as follows. For example, in the charging system of the present disclosure, when the charging of the battery is started, the control section may charge the battery in a power-on state without shutting down the automatic conveyance vehicle in a case where the temperature is equal to or lower than a predetermined temperature corresponding to a lower limit of an operating temperature range of the automatic conveyance vehicle, and shut down the automatic conveyance vehicle in a case where the temperature is higher than the predetermined temperature to charge the battery in a power-off state. In this case, since the temperature is equal to or lower than the predetermined temperature, when the automatic conveyance vehicle is shut down, there is a possibility that the automatic conveyance vehicle cannot be normally activated at the time of the end of the charging, the battery is charged in the power-on state, and the automatic conveyance vehicle can be stably operated after the end of the charging. On the other hand, in a case where the temperature is higher than the predetermined temperature and there is no possibility that the vehicle cannot be activated, it is possible to appropriately suppress the power consumption of the automatic conveyance vehicle at the time of the charging by charging the battery in the power-off state.

In the charging system of the present disclosure, the control section may activate the automatic conveyance vehicle in a case where the temperature becomes equal to or lower than the predetermined temperature during charging the battery with the automatic conveyance vehicle in the power-off state, and shut down the automatic conveyance vehicle in a case where the temperature becomes higher than the predetermined temperature during charging the battery with the automatic conveyance vehicle in the power-on state. In this way, it is possible to suppress the power consumption of the automatic conveyance vehicle at the time of the charging or to stably operate the automatic conveyance vehicle after the end of the charging by appropriately responding to the temperature change during the charging.

Another charging system of the present disclosure is a charging system for charging a battery of an automatic conveyance vehicle configured to automatically convey an article, the system including a temperature acquisition section configured to acquire a temperature when charging the battery, and a control section configured to control power supply of the automatic conveyance vehicle such that the temperature acquired by the temperature acquisition section does not become equal to or lower than a lower limit of an operating temperature range of the automatic conveyance vehicle. Therefore, as in the case of the above-described charging system, since the automatic conveyance vehicle can be stably operated after the end of the charging, it is possible to appropriately keep the automatic conveyance vehicle warm with a simple configuration that does not require a dedicated configuration for keeping the automatic conveyance vehicle warm. In this other charging system, a configuration for realizing the functions of any of the above-described charging systems may be added.

A charging control method of the present disclosure is a charging control method of charging a battery of an automatic conveyance vehicle configured to automatically convey an article, the method including:
(a) a step of acquiring a temperature when charging the battery; and
(b) a step of controlling power supply of the automatic conveyance vehicle when charging the battery based on the temperature acquired in the step of (a).

In the charging control method of the present disclosure, as in the above-described charging system, it is possible to appropriately keep the automatic conveyance vehicle warm according to the temperature environment during charging with a simple configuration that does not require a dedicated configuration for keeping the automatic conveyance vehicle warm. In this charging control method, a step of realizing any of the functions of the above-described charging system may be added.

INDUSTRIAL APPLICABILITY

The present disclosure can be used in a charging system or the like for charging a battery of an automatic conveyance vehicle.

REFERENCE SIGNS LIST

10: article management system, 12: wheeled platform, 13: loading section, 14: caster, 18: accommodation box, 20: warehouse, 22: storage shelf, 24: standby area, 30: warehouse management device, 32: control section, 34: storage section, 36: communication section, 40: charging station, 41: charging area, 42: control section, 44: temperature sensor, 46: communication section, 50, 50B: AMR, 51: control section, 52: battery, 52B: main battery, 53: sub battery, 54, 54B: power supply circuit, 54a: power supply control IC, 54b, 54c: control switch, 54d, 54e: current sensor, 55: drive section, 55a: wheel, 56: lifting and lowering section, 56a: lifting and lowering plate, 57: detection sensor, 58: storage section, 59: communication section, 60: delivery vehicle. 61: cargo chamber, 62: tail gate, 63: tail lift, 65: control section, 67: communication section

The invention claimed is:

1. A charging system for charging a battery of an automatic conveyance vehicle configured to automatically convey an article, the system comprising:
a temperature acquisition section configured to acquire a temperature when charging the battery; and
a control section configured to control power supply of the automatic conveyance vehicle when charging the battery based on the temperature acquired by the temperature acquisition section,
wherein when the charging of the battery is started, the control section charges the battery in a power-on state without shutting down the automatic conveyance vehicle in a case where the temperature is equal to or lower than a predetermined temperature corresponding to a lower limit of an operating temperature range of the automatic conveyance vehicle, and shuts down the automatic conveyance vehicle in a case where the temperature is higher than the predetermined temperature to charge the battery in a power-off state, and
wherein the control section activates the automatic conveyance vehicle in a case where the temperature becomes equal to or lower than the predetermined temperature during charging the battery with the automatic conveyance vehicle in the power-off state, and shuts down the automatic conveyance vehicle in a case where the temperature becomes higher than the predetermined temperature during charging the battery with the automatic conveyance vehicle in the power-on state.

2. A charging system for charging a battery of an automatic conveyance vehicle configured to automatically convey an article, the system comprising:
a temperature acquisition section configured to acquire a temperature when charging the battery; and
a control section configured to control power supply of the automatic conveyance vehicle such that the temperature acquired by the temperature acquisition section does not become equal to or lower than a lower limit of an operating temperature range of the automatic conveyance vehicle,
wherein when the charging of the battery is started, the control section charges the battery in a power-on state without shutting down the automatic conveyance vehicle in a case where the temperature is equal to or lower than a predetermined temperature corresponding to a lower limit of the operating temperature range of the automatic conveyance vehicle, and shuts down the automatic conveyance vehicle in a case where the temperature is higher than the predetermined temperature to charge the battery in a power-off state, and
wherein the control section activates the automatic conveyance vehicle in a case where the temperature becomes equal to or lower than the predetermined temperature during charging the battery with the automatic conveyance vehicle in the power-off state, and shuts down the automatic conveyance vehicle in a case where the temperature becomes higher than the predetermined temperature during charging the battery with the automatic conveyance vehicle in the power-on state.

3. A charging control method of charging a battery of an automatic conveyance vehicle configured to automatically convey an article, the method comprising:
(a) a step of acquiring a temperature when charging the battery; and
(b) a step of controlling power supply of the automatic conveyance vehicle when charging the battery based on the temperature acquired in the step of (a) including
when the charging of the battery is started, charging the battery in a power-on state without shutting down the automatic conveyance vehicle in a case where the temperature is equal to or lower than a predetermined temperature corresponding to a lower limit of an operating temperature range of the automatic conveyance vehicle, and shutting down the automatic conveyance vehicle in a case where the temperature is higher than the predetermined temperature to charge the battery in a power-off state, and
activating the automatic conveyance vehicle in a case where the temperature becomes equal to or lower than the predetermined temperature during charging the battery with the automatic conveyance vehicle in the power-off state, and shutting down the automatic conveyance vehicle in a case where the temperature becomes higher than the predetermined temperature during charging the battery with the automatic conveyance vehicle in the power-on state.

* * * * *